US 6,583,927 B2

United States Patent
Choi et al.

(10) Patent No.: US 6,583,927 B2
(45) Date of Patent: Jun. 24, 2003

(54) OPTICAL AMPLIFIER INCORPORATING THEREIN HOLMIUM-DOPED OPTICAL FIBER

(75) Inventors: Yong-Gyu Choi, Taejon (KR); Bong-Je Park, Pusan (KR); Kyong-Hon Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 68 days.

(21) Appl. No.: 09/963,649

(22) Filed: Sep. 27, 2001

(65) Prior Publication Data

US 2003/0002142 A1 Jan. 2, 2003

(30) Foreign Application Priority Data

Jun. 26, 2001 (KR) ........................... 2001-36514

(51) Int. Cl.$^7$ ................................ H01S 3/00
(52) U.S. Cl. ................................ 359/341.5
(58) Field of Search ........................ 359/341.5

(56) References Cited

U.S. PATENT DOCUMENTS

| 5,042,039 A | 8/1991 | Edagawa et al. |
| 5,432,806 A | 7/1995 | Snitzer et al. |
| 5,861,981 A | 1/1999 | Jabr |

OTHER PUBLICATIONS

Mejia et al. Upconversion Green Fiber Amplifier. 2001 Digest of the LEOS Summer Topical Meetings. Jul. 30, 2001–Aug. 2001. pp. 33–34.*

Sakamoto et al. 1.4 micrometer Band Gain Characteristics of a Tm–Ho–Doped Zblyan Fiber Amplifier Pumped in the 0.8 micrometer Band. IEEE Photonics Technology Letters. vol. 7, No. 9, Sep. 1995. pp. 983–985.*

Brierley et al., Lasing at 2.08um and 1.38um in a Holmium doped Fluoro–Zirconate Fibre Laser, Electronics Letters, Apr. 28, 1998, vol. 24, No. 9, pp. 539–540.

Funk et al., Excitation Spectra of the . . . , IEEE Photonics Technology Letters, vo. 5, No. 2, Feb. 1993, pp. 154–157.

Hong et al., Ho3+ to Yb3+ back transfer . . . , Appl. Phys. Lett. 63 (19), Nov. 1993, pp. 2606–2607.

* cited by examiner

Primary Examiner—Thomas G. Black
Assistant Examiner—Deandra M. Hughes
(74) Attorney, Agent, or Firm—Jacobson Holman PLLC

(57) ABSTRACT

An optical amplifier of the present invention includes a pump source for generating a pumping light, a wavelength division multiplexing (WDM) coupler for multiplexing an inputted optical signal and the pumping light and an optical fiber including a core and a clad, wherein the core has holmium ions less than 0.5 mole % and the clad has ions selected from the group consisting of transition metal ions, rare earth ions and a combination thereof. In addition, the phonon energy of a host material is less than 600 cm$^{-1}$ and an absorption band at short-wavelength side is shorter than 530 nm.

17 Claims, 5 Drawing Sheets

OPTICAL AMPLIFIER INCORPORATING THEREIN HOLMIUM-DOPED OPTICAL FIBER

FIELD OF THE INVENTION

The present invention relates to an optical fiber and an optical amplifier; and, more particularly, to a holmium ($Ho^{3+}$)-doped optical fiber and an optical amplifier operable in a wavelength ranging from 1,340 nm to 1,410 nm by using the $Ho^{3+}$-doped optical fiber.

DESCRIPTION OF THE PRIOR ART

The wavelength range of a low optical loss is approximately 1,200~1,700 nm in a conventional transmission silica optical fiber, whereby the broad wavelength range, i.e., approximately 500 nm range, is capable of being used in an optical transmission. Thus, it is most important thing to make an optical amplifier operable in this broad wavelength range. Up to now, there have been developed ion-doped optical amplifiers of which the wavelengths ranges are 1,300 nm, 1,450 nm, 1,530 nm~1,610 nm and 1,650 nm~1,680 nm, respectively. Though a rare earth ion-doped optical amplifier is capable of amplifying an optical signal having a specified wavelength band owing to characteristics of the rare earth ion and a host material, it is still demanded to develop the broad band optical amplifier in order to make use of the broad wavelength range of the low optical loss.

There has not been introduced a rare earth-doped optical amplifier representing a gain property in the wavelength ranging from 1,340 nm to 1,410 nm. However, there was announced an optical laser oscillated at 1,380 nm wavelength by using a holmium ion ($Ho^{3+}$)-doped fluoride optical fiber, as described in M. C. Brierly, P. W. France, C. A. Miller, "Lasing at 2.08 $\mu$m and 1.38 $\mu$m in a Holmium-Doped Fluoro-Zirconate Fiber Laser", Electronics Letters, Vol.204, No.9, pp. 539~540 (1988). In this case, a pumping wavelength was shorter than 530 nm.

Furthermore, there has been no research result that an upconversion pumping is possible at the wavelength ranging from 900 nm to 1,000 nm when holmium ions are doped into an amorphous optical fiber material. The upconversion can be observed at 650 nm wavelength in an experiment using the holmium-doped sample, as described in D. S. Funk, S. B. Stevens and J. C. Eden, "Excitation Spectra of the Green Ho:Fluorzirconate Glass Fiber Laser", IEEE Photonics Technology Letters, Vol.5, No.2 (1993).

There was a research in which it is effective to dope ytterbium ions ($Yb^{3+}$) in order to enhance a pumping efficiency through the upconversion pumping at the wavelength range of 900 nm to 1,000 nm. However, as a concentration of the $Yb^{3+}$ increases, an energy transfer from the $Ho^{3+}$ to the $Yb^{3+}$ is generated so that a fluorescence life time of a 1,370 nm fluorescence emission level is shortened, as described in X. X. Zhang, P. Hong, M. Base and B. H. T. Chai, "$Ho^{3+}$ to $Yb^{3+}$ Back Transfer and Thermal Quenching of Upconversion Green Emission in Fluoride Crystals", Applied Physics Letters, Vol.63, No.19, pp. 2,606~2,608 (1993). Thus, it is necessary to determine an optimized doping concentration of the $Yb^{3+}$ for preventing the energy transfer from the $Ho^{3+}$ to the $Yb^{3+}$. In case of applying the 1,370 nm band of the holmium to the optical amplifier, any optical waveguide scheme has not been suggested yet to reduce amplified spontaneous emission (ASE) of 540 nm and 750 nm fluorescence, which are emitted simultaneously with 1,370 nm fluorescence.

In case of fabricating the optical amplifier operable in an aimed wavelength band by using ($^5S_2$, $^5F_4$)$\rightarrow$$^5I_5$ transition of the $Ho^{3+}$, there are several problems as followings.

First, the ($^5S_2$, $^5F_4$) level of the $Ho^{3+}$ is positioned at approximately 535 nm wavelength. Thus, if a pumping source is shorter than 540 nm wavelength, it is difficult to secure the suitable pumping source in practice. Furthermore, a splicing loss to the transmission silica optical fiber also increases in case of shortening a cutoff wavelength of the optical waveguide.

Second, since a branching ratio of the 540 nm fluorescence and the 750 nm fluorescence which are emitted from the ($^5S_2$, $^5F_4$) level is higher than that of the 1,370 nm fluorescence, the gain of the 1,370 nm fluorescence is saturated at a low gain value because of the ASE.

Third, when an absorption band of the host material at short-wavelength side is overlapped with the ($^5S_2$, $^5F_4$) level, the energy of the ($^5S_2$, $^5F_4$) level is absorbed due to a band gap transition of the host material, thereby decreasing the fluorescence lifetime and the fluorescence intensity remarkably.

It is necessary to use a low phonon energy host to minimize the decrease of the fluorescence lifetime, because an energy gap between the ($^5S_2$, $^5F_4$) level and next-lower-lying level, i.e., $^5F_5$, is approximately 2,800 $cm^{-1}$ so that a non-radiative relaxation may occur owing to a multiphonon relaxation mechanism. In addition, in order to enhance gain property at 1,370 nm band, the fluorescence lifetime of the ($^5S_2$, $^5F_4$) level should be prolonged and a refractive index should be small because the splicing loss induced from the difference of the refractive indices should be minimized in case of being contact with the transmission silica optical fiber. Since the fluorescence lifetime of the ($^5S_2$, $^5F_4$) level is shortened by the absorption due to a vibration of hydroxyl radical (OH–), it should be further satisfied to remove the hydroxyl radicals from the optical waveguide with ease.

SUMMARY OF THE INVENTION

It is, therefore, an object of the present invention to provide a holmium ($Ho^{3+}$) doped optical fiber for use in an optical amplifier.

It is another object of the present invention to provide an optical amplifier operable in 1,340 nm to 1,410 nm incorporating therein the $Ho^{3+}$-doped optical fiber.

In accordance with one aspect of the present invention, there is provided an optical fiber composition, wherein a representative phonon energy of a host material is less than 600 $cm^{-1}$ and an absorption band at short-wavelength side is less than 530 nm, the optical fiber composition comprising: a core including holmium ions less than 0.5 mole %; and a clad including ions selected from the group consisting of transition metal ions, rare earth ions and a combination thereof.

In accordance with another aspect of the present invention, there is provided an optical fiber, wherein a representative phonon energy of a host material is less than 600 $cm^{-1}$ and an absorption band at short-wavelength side is less than 530 nm, the optical fiber comprising: a core including holmium ions less than 0.5 mole %; and a clad including ions selected from the group consisting of transition metal ions, rare earth ions and a combination thereof.

In accordance with further another aspect of the present invention, there is provided an optical amplifier for amplifying an optical signal, comprising: a pump source for generating a pumping light; a wavelength division multiplexing (WDM) coupler for multiplexing an input optical signal and the pumping light; and an optical fiber including a core and a clad, wherein the core has holmium ions less than 0.5 mole % and the clad has ions selected from the group consisting of transition metal ions, rare earth ions and a combination thereof.

BRIEF DESCRIPTION OF THE DRAWINGS

The above and other objects and features of the present invention will become apparent from the following description of the preferred embodiment given in conjunction with the accompanying drawings, in which.

DETAILED DESCRIPTION OF THE PREFERRED EMBODIMENTS

An optical fiber of the present invention comprises a core 530 including holmium ions less than 0.5 mole % and a clad 540 including ion selected from the group consisting of transition metal ions, rare earth ions and a combination thereof. The optical fiber of the present invention has characteristics that a representative phonon energy of a host material is less than 600 cm$^{-1}$ and an absorption band at short-wavelength side is less than 530 nm. The core of the optical fiber may include ytterbium ions less than 1 mole %. Here, the transition metal ions may be used as titanium ions ($Ti^{3+}$), vanadium ions ($V^{5+}$), chromium ions ($Cr^{3+}$) or calcium ions ($Ca^{2+}$). Furthermore, the rare earth ions may be used as erbium ions ($Er^{3+}$), terbium ions ($Tb^{3+}$), europium ions ($Eu^{3+}$) or neodymium ions ($Nd^{3+}$).

An optical amplifier of the present invention for amplifying an optical signal, comprises a pump source for generating a pumping light 510, a wavelength division multiplexing (WDM) coupler 520 for multiplexing an input optical signal and the pumping light, and the optical fiber including a core 530 and a clad 540, wherein the core has holmium ions less than 0.5 mole % and the clad has ions selected from the group consisting of transition metal ions, rare earth ions and a combination thereof. It is preferable that the phonon energy of a host material of the optical fiber should be less than 600 cm$^{-1}$ and an absorption band at short-wavelength side should be shorter than 530 nm. The pumping light has wavelengths ranging from approximately 880 nm to 920 nm or approximately 970 nm to 990 nm. In the optical fiber, ytterbium ions may be doped into the core within 1 mole %. In case of co-doping the ytterbium ions with the holmium ions, it is preferable that the pumping light should have the wavelengths raging from approximately 880 nm to 1,000 nm.

In accordance with the present invention, it is preferable that the concentration of the transition metal ions should be within 2 mole % and the rare earth ions should be within 4 mole %. However, it is not restricted to these concentration values because these are mainly determined by an absorption coefficient of each ion and a function of pumping light intensity.

Figure 1:
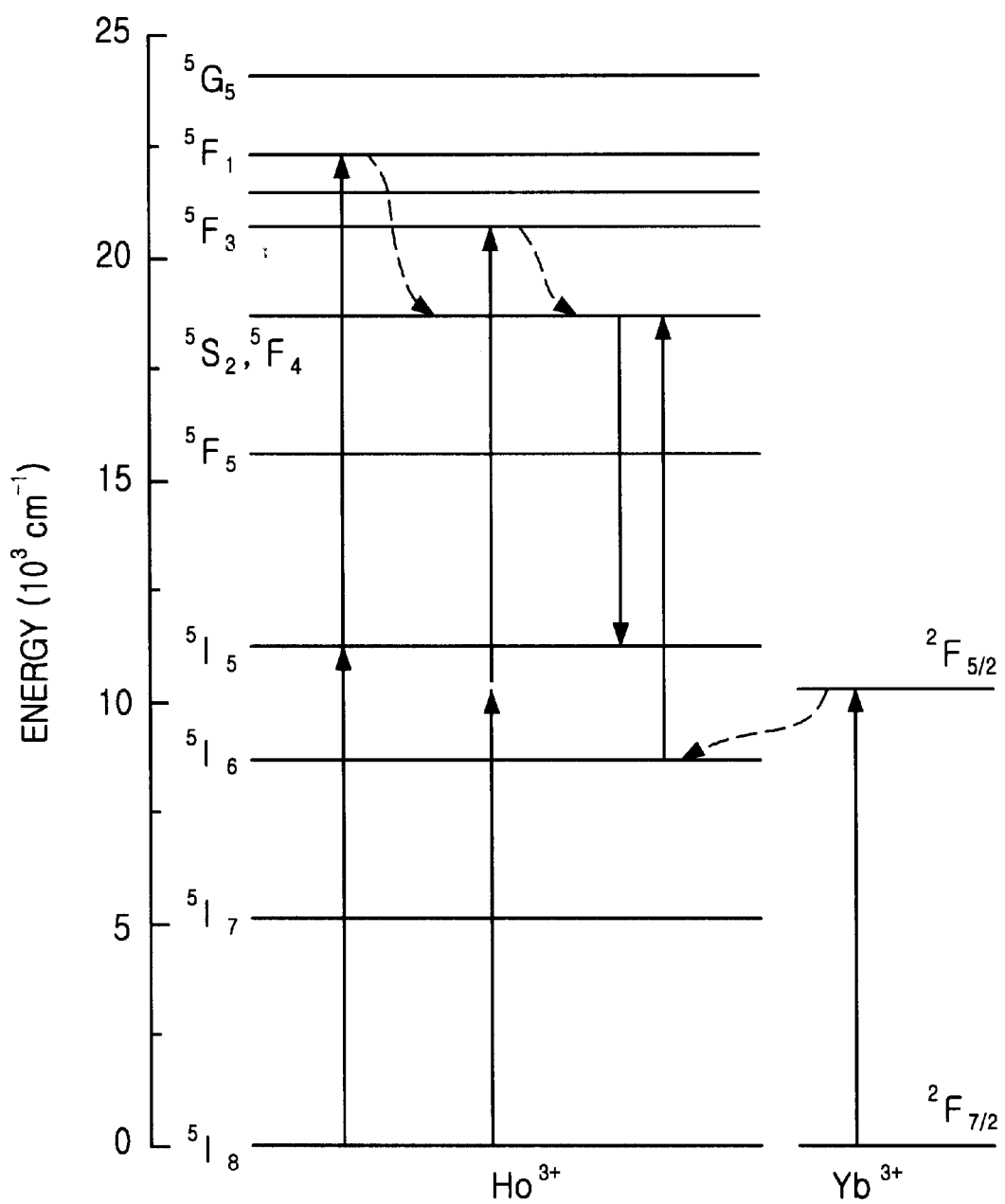
FIG. 1 is energy levels representing an absorption transition mechanism and a fluorescence emission transition mechanism of holmium ions ($Ho^{3+}$) and ytterbium ions ($Yb^{3+}$) in accordance with the present invention.

Referring to FIG. 1, there is shown energy levels existing in a 4f-configuration of the holmium ions and an upconversion pumping mechanism in accordance with the present invention. In order to utilize the fluorescence in the range of approximately 1,340 nm to 1,410 nm generated from ($^5S_2$, $^5F_4$)→$^5I_5$ transition, the holmium doped optical fiber or the holmium/ytterbium co-doped optical fiber is suitable for the present invention, which will be set forth in more details referring to examples hereinafter.

EXAMPLE 1

Selection of a Preferable Host Material

For implementing the present invention, holmium-doped glasses of various compositions were prepared. A concentration of the holmium was kept to be approximately 0.1 mole % and a host material is selected from the group consisting of a heavy metal fluoride glass ($ZrF_4$—$BaF_2$—$LaF_3$—$AlF_3$—$NaF$), a heavy metal oxide glass ($PbO$—$Bi_2O_3$—$Ga_2O_3$), a selenide glass (Ge—As—Se) and a sulfide glass (Ge—Ga—S).

Thereafter, a fluorescence lifetime of a ($^5S_2$, $^5F_4$) level was measured for each glass. As the concentration of the doped holmium is small, each measured fluorescence lifetime is influenced by a spontaneous transition probability of the ($^5S_2$, $^5F_4$) level, a multiphonon relaxation rate and an energy transfer rate to the host. The measured fluorescence lifetime is described in table 1.

TABLE 1

| Glass sample | fluorescence lifetime ($\mu s$) |
| --- | --- |
| heavy metal fluoride glass | approximately 320 |
| sulfide glass | approximately 70 |
| heavy metal oxide glass | approximately 15 |
| tellurite glass | approximately 10 |
| selenide glass | below 10 |

Though the phonon energy of the selenide glass is least of all, the measured fluorescence lifetime is smallest. This is caused by a high refractive index of the glass and the absorption band at short-wavelength side, which is positioned at approximately 800 nm. In the tellurite glass, though the absorption band at short-wavelength side is positioned at approximately 350 nm, the phonon energy is measured to be highest of all, i.e., approximately 700 cm$^{-1}$. Thus, it is understood that the fluorescence lifetime of the conventional silicate glass is extremely small because the phonon energy of the conventional glass is large.

The phonon energy of the heavy metal oxide glass is approximately 500 cm$^{-1}$, which is similar to that of the heavy metal fluoride glass. However, the heavy metal oxide glass represents the difference in the absorption band at short-wavelength side and the refractive index at a visible light range in comparison with those of the heavy metal fluoride glass. This is well illustrated in table 2.

TABLE 2

| | heavy metal oxide | heavy metal fluoride |
|---|---|---|
| absorption band (nm) | approximately 500 | approximately 200 |
| refractive index | approximately 2.3 | approximately 1.5 |

Therefore, the spontaneous transition probability of the the ($^5S_2$, $^5F_4$) level of the heavy metal oxide glass is larger than that of the heavy metal fluoride glass. In addition, the energy transfer to the host in the heavy metal oxide glass is larger than that in the fluoride glass.

Referring back to table 1, the reason that the fluorescence lifetime of the sulfide glass is short, is that the absorption band at short-wavelength side is relatively long.

Figure 2:
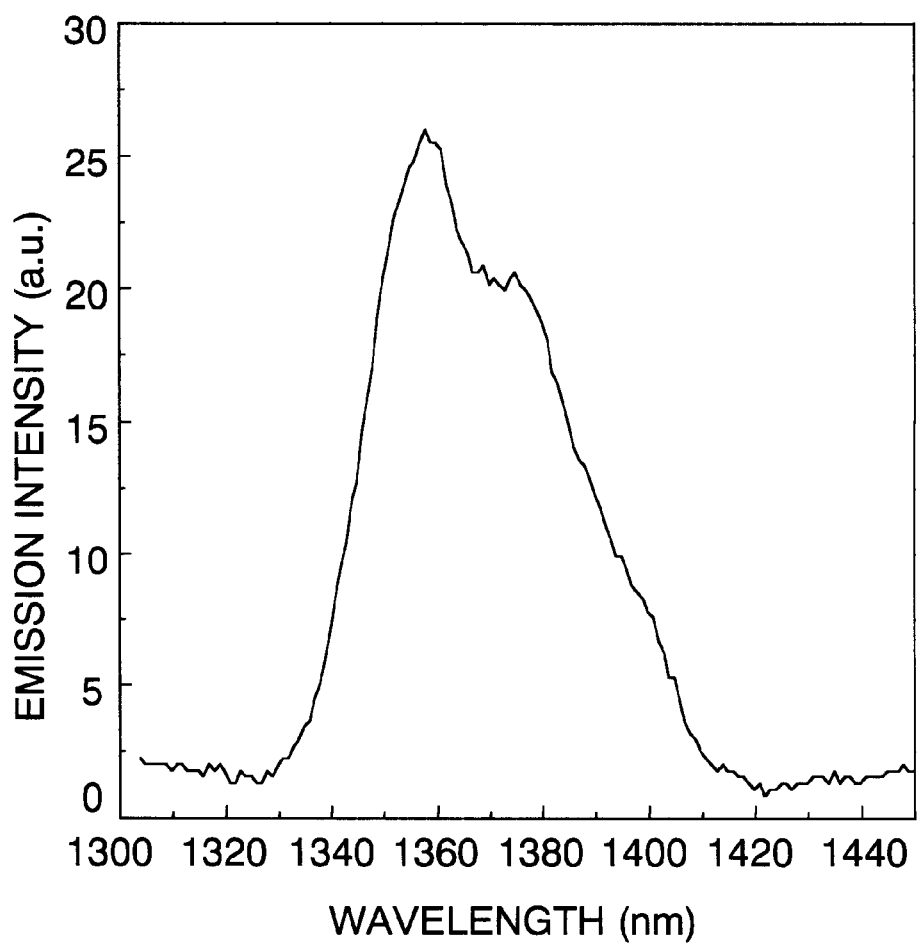
FIG. 2 is the fluorescence emission spectrum of 1,370 nm emitted from the $Ho^{3+}$ in accordance with the present invention.

From the result as aforementioned, the optimized host material may be determined in view of the fluorescence lifetime of the ($^5S_2$, $^5F_4$) level. In accordance with the embodiment, the fluoride glass is more preferred. Referring to FIG. 2, there is shown a fluorescence emission spectrum of the fluoride glass. Therefore, in order to be employed in the optical fiber of the present invention, it is necessary that the representative phonon energy of the optical fiber should be less than 600 $cm^{-1}$ and the absorption band at short-wavelength side is shorter than 530 nm.

EXAMPLE 2

Optimized Concentration of Holmium

For determining how much holmium ions are doped into the fluoride glass, the fluorescence lifetime of the ($^5S_2$, $^5F_4$) level is measured, experimentally. As the concentration of the holmium increases, the fluorescence lifetime of the ($^5S_2$, $^5F_4$) level decreases. This phenomenon is referred to a concentration quenching.

Figure 3:
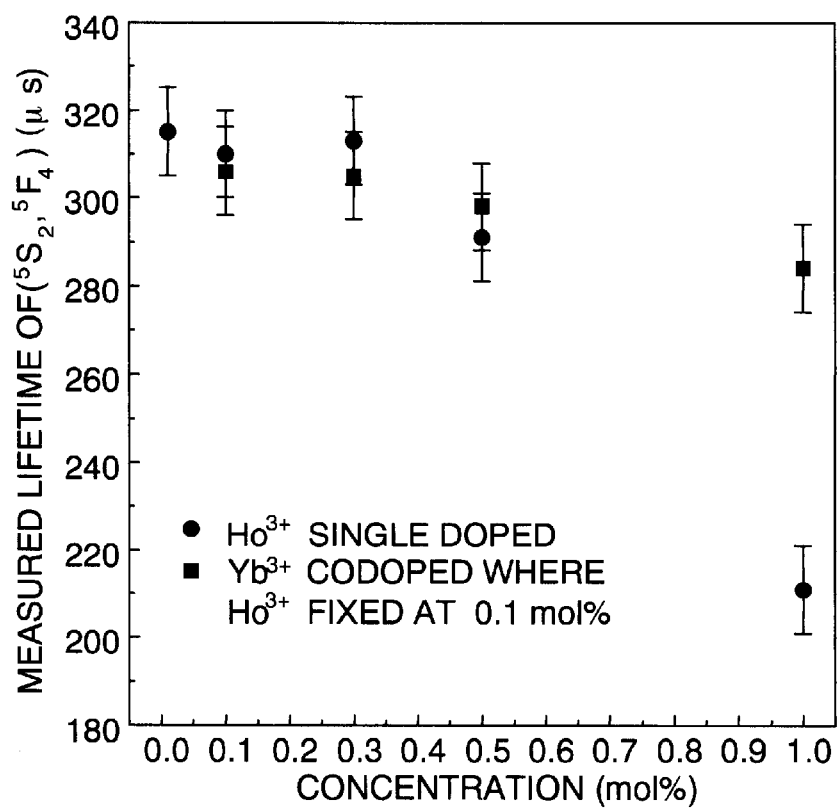
FIG. 3 is a graph showing a lifetime of a ($^5S_2$, $^5F_4$) level compared with a $Ho^{3+}$-doped fluoride glass and a $Ho^{3+}/Yb^{3+}$ co-doped fluoride glass in accordance with the present invention.

Referring to FIG. 3, there is a graph showing various fluorescence lifetimes measured from several heavy metal fluoride glasses, wherein the concentrations of the doped holmium are different there among. The fluorescence lifetime is nearly constant when the concentration of the holmium is less than 0.5 mole %. But, the fluorescence lifetime is remarkably reduced at approximately 1.0 mole %. Therefore, it is preferable that the doped amount of the holmium should be less than 0.5 mole %. Moreover, in order to enhance the utility of an optical amplifier, it is preferable that upconversion pumping should be done within the wavelengths range that a conventional high power laser diode can be operated.

EXAMPLE 3

Excitation Spectrum of $Ho^{3+}$-Doped Sample

Figure 4:
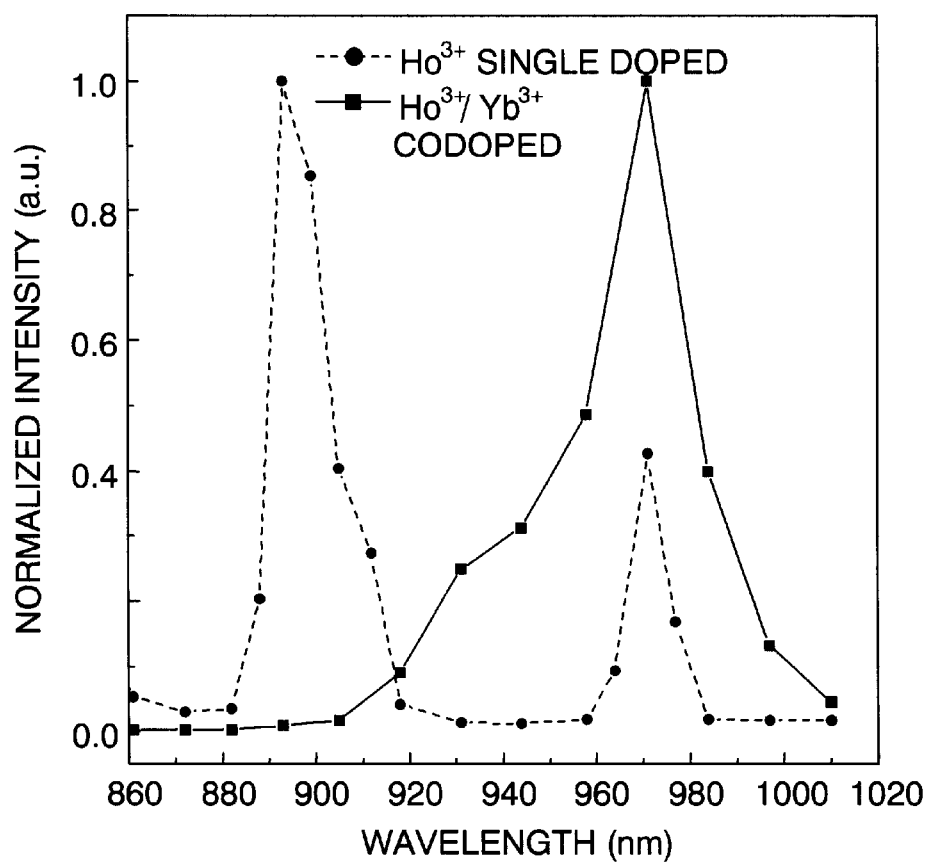
FIG. 4 is an excitation spectrum compared with the holmium-doped fluoride glass and the $Ho^{3+}/Yb^{3+}$ co-doped fluoride glass in accordance with the present invention.

The excitation spectrum of the 0.3 mole % holmium-doped sample is measured in which spectrum range is approximately 850 nm to 1,000 nm. In the experiment, the pumping source is used as a Ti-sapphire laser and the intensity of the pumping light is fixed. Referring to FIG. 4, there is the excitation spectrum of the holmium-doped sample. In this figure, the 1,300 nm fluorescence is observed when it is pumped at the wavelengths ranging from approximately 880 nm to 920 nm and approximately 970 nm to 990 nm.

The pumping wavelengths ranges are half times to the energy of $^5F_1$ level, i.e., 22,300 $cm^{-1}$, and the energy of $^5F_3$ level, i.e., 20,700 $cm^{-1}$. Since an oscillator strength of $^5I_8 \rightarrow ^5F_1$ absorption transition is higher than that of $^5I_8 \rightarrow ^5F_3$ transition and $^5I_8 \rightarrow ^5F_5$ transition exists in the range of about 880 nm to 920 nm, a pumping efficiency is more higher at 880 nm to 920 nm, as referred to FIG. 4.

In order to improve the efficiency, ytterbium is co-doped with the holmium, which is set forth in detail hereinafter. In holmium/ytterbium co-doped sample, the optimized pumping wavelengths range is approximately 910 nm to 1,000 nm. Thus, the conventional high-power laser diode can be utilized as the pumping source.

From the excitation spectrum of the holmium-doped sample, it is understood that the optimized pumping wavelengths ranges are approximately 880 nm to 920 nm and approximately 970 nm to 990 nm, respectively.

EXAMPLE 4

Excitation Spectrum of $Ho^{3+}/Yb^{3+}$ Co-Doped Sample

The excitation spectrum of the $Ho^{3+}/Yb^{3+}$ co-doped sample is measured under the same condition of the example 3. In this experiment, it is observed that the fluorescence intensity of 1,370 nm band is improved by about 100 times to 1,000 times according to the addition of the ytterbium ions. Referring back to FIG. 4, the 1,370 nm fluorescence is observed at the wavelengths ranging from approximately 880 nm to 920 nm, as same to the result of the example 3. It is noticed that the excitation seems to be happened at 910 nm to 1,000 nm because the pumping efficiency at 910 nm to 1,000 nm is approximately 100 times to 1,000 times higher than that of the holmium-doped sample. At the wavelengths ranging from 910 nm to 1,000 nm in which the co-doped sample represents an excellent upconversion pumping characteristic, $^2F_{7/2} \rightarrow ^2F_{5/2}$ transition of the ytterbium ions exists, as depicted in FIG. 1. Therefore, the pumping light having this wavelength range excites the ytterbium ions, first of all. Then, the energy transfer is happened from the excited ytterbium ions to the $^5I_6$ level of the holmium ion. Thereafter, the $^5I_6$ level absorbs the pumping light so that electrons are excited to the ($^5S_2$, $^5F_4$) level.

Another excitation mechanism is set forth by a cross relaxation between the $^2F_{5/2}$ level of the ytterbium ion and the $^5I_6$ level of the holmium ion. Namely, the fluorescence lifetime of the holmium pumped by 980 nm is rather longer than that of the holmium pumped directly, because the energy transfer from the $^2F_{5/2}$ level of the ytterbium ion to the $^5I_6$ level of the holmium ion takes place slowly.

EXAMPLE 5

Concentration of the $Yb^{3+}$

In the $Ho^{3+}/Yb^{3+}$ co-doped sample, it is possible to add the ytterbium ions up to a solubility limit of the ytterbium ion to the host material providing that the energy transfer is happened from the ytterbium to the holmium only. However, as the concentration of the ytterbium ions increases, the cross relaxation, i.e., $Ho^{3+}$: ($^5S_2$, $^5F_4$), $Yb^{3+}$:$^2F_{7/2} \rightarrow Ho^{3+}$:$^5I_6$, $Yb^{3+}$:$^2F_{5/2}$, is generated so that the fluorescence lifetime of the ($^5S_2$, $^5F_4$) level may be shortened. Thus, in order to determine the optimized concentration of the ytterbium ion, the fluorescence lifetime of the ($^5S_2$, $^5F_4$) level is measured experimentally for the $Ho^{3+}/Yb^{3+}$ co-doped fluoride glass sample by a direct excitation to the $Ho^{3+}$:$^5F_3$ level.

Referring to FIG. 3, there is a graph representing the fluorescence lifetimes of various samples, wherein the concentration of the ytterbium ion is varied and that of the holmium ion is fixed to 0.1 mole % among the samples. From this result, it is understood that the fluorescence lifetime of the ($^5S_2$, $^5F_4$) level of the $Ho^{3+}/Yb^{3+}$ co-doped sample is approximately 0.9 times to that of the holmium doped sample even though the concentration of the ytterbium ion reaches to 1.0 mole %. Thus, the optimized concentration of the ytterbium ion is up to 1.0 mole %.

In accordance with the above examples, it is possible to determine the optimized host material, the concentration of the dopant and the pumping wavelength range for applying the 1,300 nm fluorescence of the holmium to the optical amplifier. That is, the host material should have the representative phonon energy less than 600 $cm^{-1}$ and the absorption band at short-wavelength side should be shorter than 530 nm. It is preferable that the concentration of the holmium ion should be less than 0.5 mole %. The pumping wavelengths range is preferred to be approximately 880 nm to 920 nm and approximately 970 nm to 990 nm in case of adding the holmium ion alone. Meanwhile, in case of the $Ho^{3+}/Yb^{3+}$ co-doped sample, the pumping wavelengths range is preferred to be ranging from 910 nm to 1,000 nm.

Figure 5:
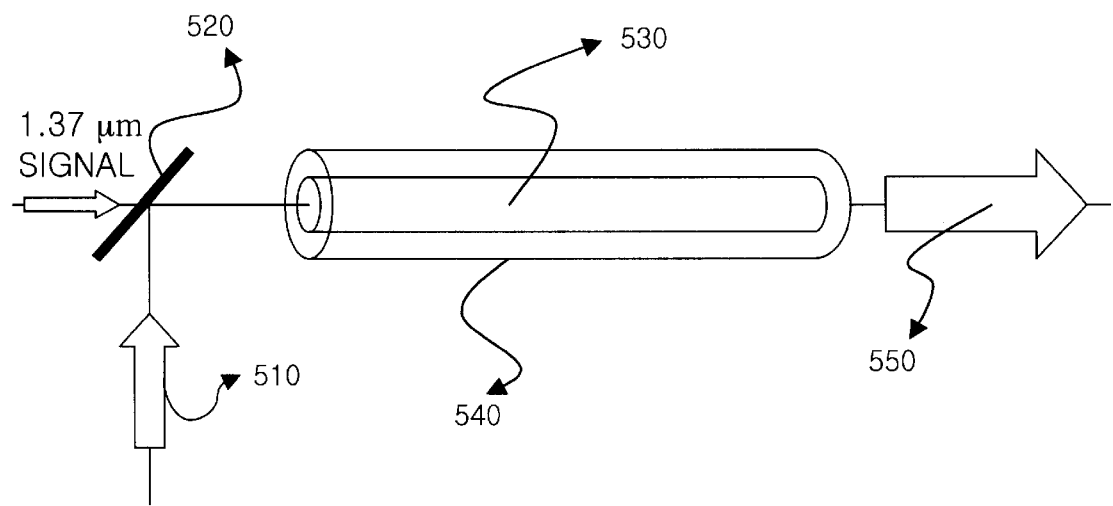
FIG. 5 is schematic view setting forth an optical amplifier of 1,370 nm band using the $Ho^{3+}$-doped fluoride optical fiber in accordance with the present invention.

Referring to FIG. 5, there is shown a 1,370 nm-band optical amplifier using the holmium doped optical fiber. An optical signal having 1,370 nm wavelength and the pumping light 510 are inputted to a wavelength division multiplexing (WDM) coupler 520. Thereafter, the coupled signal is transmitted to the $Ho^{3+}$-doped optical fiber or the $Ho^{3+}/Yb^{3+}$ co-doped optical fiber, wherein the optical fiber includes a core 530 and a clad 540. The $Ho^{3+}$ or the $Ho^{3+}/Yb^{3+}$ are doped into the core 530 and transition metal ions or rare earth ions are doped into the clad 540. After the coupled signal passing through the optical fiber, an amplified signal 550 is outputted at last.

While the 540 nm fluorescence and the 750 nm fluorescence as well as the 1,370 nm fluorescence are emitted from the ($^5S_2$, $^5F_4$) level, the branching ratio of 540 nm and 750 nm fluorescence is larger than that of the 1,370 nm fluorescence so that it is necessary to inhibit the ASE in the optical waveguide effectively. Since it is possible to position the cutoff wavelength at approximately 880 nm in case of using the upconversion pumping mechanism in accordance with the present invention, the light propagates in multi modes at 540 nm-band in the optical waveguide. Therefore, most of the lights are transmitted through the clad. It is preferable that the transition metal ions or the rare earth ions are doped into the clad because the transition metal ions or the rare earth ions have characteristics of absorbing the lights having 540 nm and 750 nm wavelengths and not absorbing the lights having the pumping wavelength and 1,370 nm wavelength.

If the transition metal ions or the rare earth ions are doped into the core, the distance between the ions are so narrow that the non-radiative energy transfer is generated and the fluorescence lifetime of the ($^5S_2$, $^5F_4$) level is shortened. Thus, in order to invoke only the radiative energy transfer, it is preferable that the holmium ions are doped into the core and the transition metal ions or the rare earth ions are doped into the clad, wherein the transition metal ions are selected from the group consisting of titanium ions ($Ti^{3+}$), vanadium ions ($V^5+$), chromium ions ($Cr^{3+}$) and calcium ions ($Ca^2+$), and the rare earth ions are selected from the group consisting of erbium ions ($Er^{3+}$), terbium ions ($Tb^{3+}$), europium ions ($Eu^{3+}$) and neodymium ions ($Nd^{3+}$). Therefore, the 540 nm fluorescence is absorbed by the transition metal ions or the rare earth ions in the clad and the 1,370 nm fluorescence can be transmitted, concentrated in the core.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber composition, wherein a representative phonon energy of a host material is less than 600 $cm^-$ and an absorption band at short-wavelength side is less than 530 nm, the optical fiber composition comprising:

a core including holmium ions less than 0.5 mole %; and a clad including ions selected from the group consisting of transition metal ions, rare earth ions and a combination thereof.

2. The optical fiber composition as recited in claim 1, wherein the core includes ytterbium ions less than 1 mole %.

3. The optical fiber composition as recited in claim 1, wherein the transition metal ions are selected from the group consisting of titanium ions ($Ti^{3+}$), vanadium ions ($V^{5+}$), chromium ions ($Cr^{3+}$) and calcium ions ($Ca^{2+}$).

4. The optical fiber composition as recited in claim 1, wherein the rare earth ions are selected from the group consisting of erbium ions ($Er^{3+}$), terbium ions ($Tb^{3+}$) europium ions ($Eu^{3+}$) and neodymium ions ($Nd^{3+}$).

5. The optical fiber composition as recited in claim 1, wherein the host material is a fluoride glass.

6. An optical fiber, wherein a representative phonon energy of a host material is less than 600 $cm^{-1}$ and an absorption band at short-wavelength side is less than 530 nm, the optical fiber comprising:

a core including holmium ions less than 0.5 mole %; and a clad including ions selected from the group consisting of transition metal ions, rare earth ions and a combination thereof.

7. The optical fiber as recited in claim 6, wherein the core includes ytterbium ions less than 1 mole %.

8. The optical fiber as recited in claim 6, wherein the transition metal ions are selected from the group consisting of titanium ions ($Ti^{3+}$) vanadium ions ($V^{5+}$), chromium ions ($Cr^{3+}$) and calcium ions ($Ca^{2+}$).

9. The optical fiber as recited in claim 6, wherein the rare earth ions are selected from the group consisting of erbium ions ($Er^{3+}$), terbium ions ($Tb^{3+}$), europium ions ($Eu^{3+}$) and neodymium ions ($Nd^{3+}$).

10. The optical fiber as recited in claim 6, wherein the host material is a fluoride glass.

11. An optical amplifier for amplifying an optical signal, comprising:

a pump source for generating a pumping light;

a wavelength division multiplexing (WDM) coupler for multiplexing an inputted optical signal and the pumping light; and an optical fiber including a core and a clad, wherein the core has holmium ions less than 0.5 mole % and the clad has ions selected from the group consisting of transition metal ions, rare earth ions and a combination thereof, wherein the phonon energy of a host material is less than 600 $cm^{-1}$ and an absorption band at short-wavelength side is shorter than 530 nm.

12. The optical amplifier as recited in claim 11, wherein the wavelength of ($^5S_2$, $^5F_4$)→$^5I_5$ transition is ranging from approximately 1,340 nm to 1,410 nm.

13. The optical amplifier as recited in claim 11, wherein the pumping light has wavelengths ranging from approximately 880 nm to approximately 920 nm or approximately 970 nm to approximately 990 nm.

14. The optical amplifier as recited in claim 11, wherein ytterbium ions are doped into the core within 1 mole %.

15. The optical amplifier as recited in claim 11, wherein the pumping light has the wavelengths raging from approximately 880 nm to approximately 1,000 nm.

16. The optical amplifier as recited in claim 11, wherein the transition metal ions are selected from the group consisting of $Ti^{3+}$, $V^{5+}$, $Cr^{3+}$ and $Ca^{2+}$.

17. The optical amplifier as recited in claim 11, wherein the rare earth ions are selected from the group consisting of $Er^{3+}$, $Tb^{3+}$, $Eu^{3+}$ and $Nd^{3+}$.

* * * * *